United States Patent Office 3,085,553
Patented Apr. 16, 1963

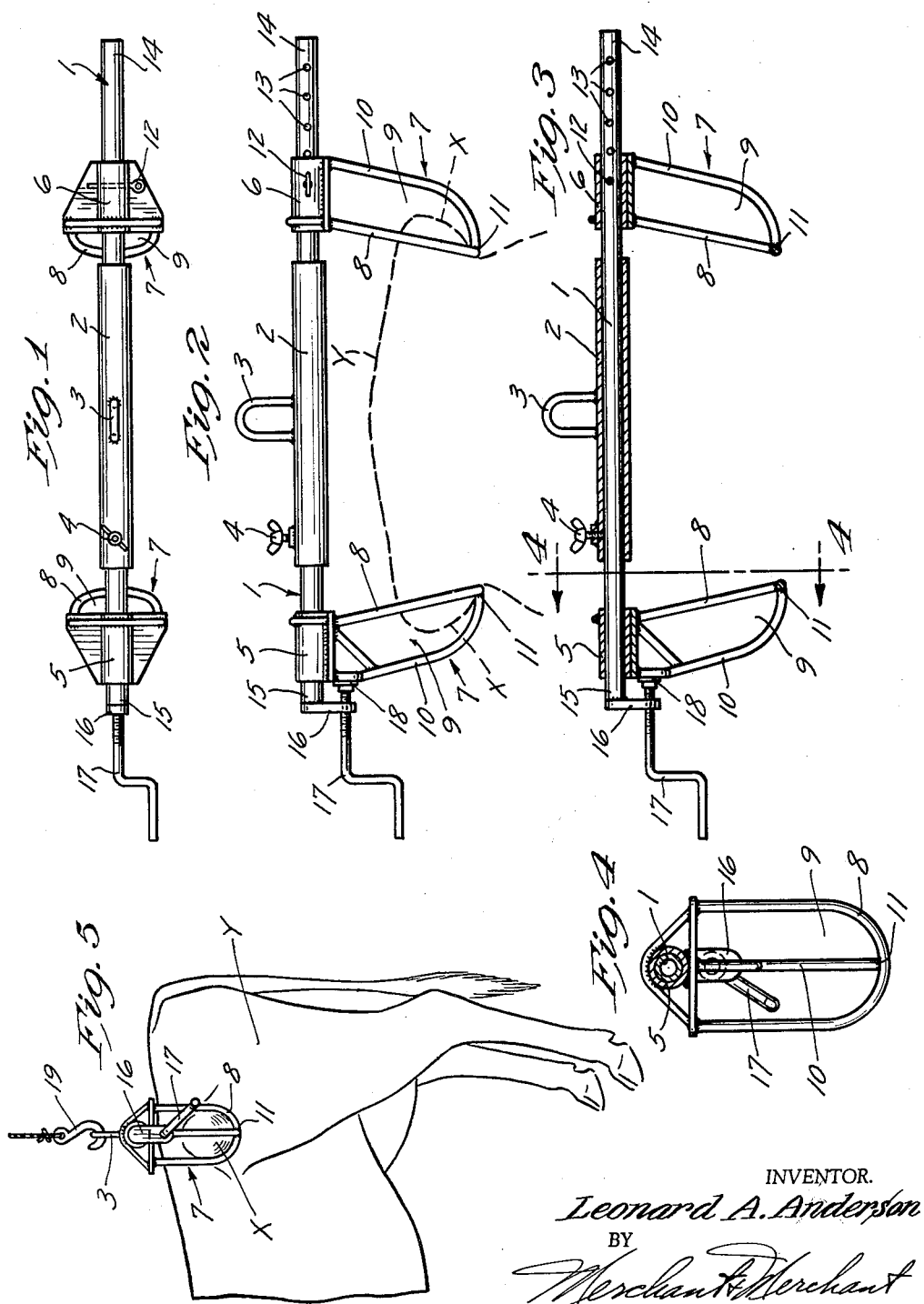

3,085,553
LIFT FOR COWS
Leonard A. Anderson, Box 386, Glenwood City, Wis.
Filed Nov. 13, 1957, Ser. No. 696,101
3 Claims. (Cl. 119—100)

My invention relates to animal restraining and lifting devices and more particularly to mechanical lifts for sick cows or other animals having relatively large outwardly projecting haunch or hip bones and where the usual belly girth or sling is unsuitable.

The primary object of my invention is the provision of a device of the class described which may be used to advantage by veterinarians and the like for the lifting and positioning of sick cows for purposes of examination and the like without harm or pain to the animal.

A further object of my invention is the provision of a device of the class described for lifting animals that are unable to rise for various reasons and which may be operated and adjusted to permit such animals the free use of their pelvic limbs during the act of lifting and upon reaching a standing position.

A further object of my invention is the provision of a device of the class above described which may be quickly applied to and removed from the animal with a minimum of skill and experience.

A further object of my invention is the provision of a device of the class above described which has a minimum of working parts and which is quickly adjustable for use on animals of varying size.

A still further object of my invention is the provision of a device of the class above described which is relatively inexpensive to produce, which is light in weight yet durable in construction.

The above and still further objects of my invention will become apparent from the following detailed specification, appended claims and attached drawings.

Referring to the drawings wherein like characters indicate like parts throughout the several views:

FIG. 1 is a view in top plan of my novel structure;

FIG. 2 is a view in side elevation;

FIG. 3 is a view corresponding to FIG. 2, but showing some of the parts thereof in axial section;

FIG. 4 is a view in vertical section taken substantially on the line 4—4 of FIG. 3; and FIG. 5 is a view in end elevation as seen from left to right with respect to FIG. 2.

Referring with greater particularity to the drawings, the numeral 1 indicates an elongated lifting bar having a sleeve 2 mounted for longitudinal sliding movements on its intermediate portion. The sleeve 2 is provided at its central portion with an upstanding hook 3, shown as being of the closed type, and a wing nut equipped set screw 4 for locking the sleeve 2 in desired adjusted positions. Mounted for sliding movements on opposite ends of the bar 1, axially outwardly of the sleeve 2, are tubular mounting heads 5 and 6, each of which is shown as having rigidly secured thereto and depending therefrom a socket element, identified in its entirety by the numeral 7. The socket elements 7 oppose each other and preferably and as shown comprise generally U-shaped members 8 which converge downwardly and define openings 9 which are generally aligned for the reception of the haunch or hip bones X of a cow or the like Y. The socket elements 7 also include brace rods 10 which connect the axial outer portions of the heads 5, 6 and the closed lower end portions of the U-shaped members 8, as indicated by the numeral 11. The head 6 is provided with a set screw 12 which is alignable with one or more of the openings 13 on the outer end 14 of the lifting bar 1.

Rigidly secured to and depending from the inner end 15 of the bar 1 is a plate 16. A crank-equipped screw device 17 in parallel spaced relation to the bar 1 has an enlarged outer end portion 18 which engages the head 5 and imparts final adjustments thereto. Preferably, the U-shaped members 8 are formed from cross-sectionally circular metal stock so as to present a smooth rounded surface for engagement with the haunches of the cow immediately adjacent the haunch or hip bone X.

From the above, it should be clear that because of the adjustability of the sleeve 2 as well as the heads 5 and 6 my novel structure may be utilized on cows or other like animals which vary quite radically in size. It is, of course, extremely desirable if not important that once the heads 5 and 6 are positioned to cause their respective socket elements 7 to engage the haunch bones X of an animal Y, as shown in FIG. 2, the sleeve 2 be centered with respect to the heads 5, 6 so as to maintain the bar 1 in a horizontal position during lifting movements. Such lifting movements are, of course, imparted through the medium of a hook 19 operatively associated with any conventional lift mechanism, not shown.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What I claim is:

1. An animal restraining and posterior hoisting device comprising a lifting bar of a length in excess of maximum width of the animal, a hook-equipped sleeve slidably mounted on the intermediate portion of said bar, means for securing said hook-equipped sleeve in longitudinally adjusted position on said bar, a restraining head slidably mounted on each end of said bar and each head including a depending haunch engaging socket, means independently securing each head in longitudinally adjusted position on opposite end portions of said bar to position and securing the protruding hip bones of an animal's posterior within the opposed sockets thereof independently of relative adjusted positions of said hook-equipped sleeve on said bar.

2. The device of claim 1 in which a set screw is carried by said hook-equipped sleeve to engage said bar, a second set screw is carried by one of said heads and selectively engageable with a given one of a plurality of axially spaced openings on the adjacent end of said lifting bar; and a crank-equipped screw carried by the opposite end of said bar in laterally spaced generally parallel relationship thereto, said screw having an enlarged inner end which operatively engages the adjacent mounting head.

3. An animal hoist comprising a beam adapted to be disposed in a generally horizontal position, clamping members on said beam, one said clamping member being slidably supported on said beam, adjusting means on said beam to move one said clamping member toward the other, said beam supporting said clamping members, means on said beam for attaching a hoisting device to said hoist, and downwardly extending hip receiving members, each attached to one of said clamping members, said clamping members being adapted to prevent an animal having its hips received in said hip receiving members from twisting its body to thereby release itself from said hoist.

References Cited in the file of this patent

UNITED STATES PATENTS

| | | |
|---|---|---|
| 661,488 | Broadbooks | Nov. 13, 1900 |
| 895,249 | Garlock | Aug. 4, 1908 |
| 1,649,364 | Peterson | Nov. 15, 1927 |
| 1,807,360 | Wehr | May 26, 1931 |
| 2,743,701 | Boyd | May 1, 1956 |
| 2,909,153 | McKinley | Oct. 20, 1959 |